United States Patent
Xu et al.

(10) Patent No.: US 11,968,682 B2
(45) Date of Patent: Apr. 23, 2024

(54) UPLINK DYNAMIC GRANT-FREE TRANSMISSION METHOD AND APPARATUS

(71) Applicant: HUAWEI TECHNOLOGIES CO., LTD., Shenzhen (CN)

(72) Inventors: Xiuqiang Xu, Shanghai (CN); Yan Chen, Shanghai (CN); Yongxia Lyu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 468 days.

(21) Appl. No.: 17/213,604

(22) Filed: Mar. 26, 2021

(65) Prior Publication Data

US 2021/0219333 A1 Jul. 15, 2021

Related U.S. Application Data

(63) Continuation of application No. PCT/CN2019/108690, filed on Sep. 27, 2019.

(30) Foreign Application Priority Data

Sep. 28, 2018 (CN) .......................... 201811142702.8

(51) Int. Cl.
*H04W 72/23* (2023.01)
*H04L 5/00* (2006.01)
(Continued)

(52) U.S. Cl.
CPC ........... *H04W 72/23* (2023.01); *H04L 5/0098* (2013.01); *H04W 72/0446* (2013.01); *H04W 72/0453* (2013.01)

(58) Field of Classification Search
CPC ............... H04W 72/115; H04W 72/23; H04W 72/0446; H04W 72/0453; H04W 48/12;
(Continued)

(56) References Cited

U.S. PATENT DOCUMENTS

2018/0042016 A1 2/2018 Babaei et al.
2018/0123765 A1 5/2018 Cao et al.
(Continued)

FOREIGN PATENT DOCUMENTS

CN 107371273 A 11/2017
CN 107852722 A 3/2018
(Continued)

OTHER PUBLICATIONS

Lenovo et al. "Enhanced SR carried in UL control channel." 3GPP TSG RAN WG1 Meeting NR#3, R1-1715540. Nagoya, Japan. Sep. 18-21, 2017. 3 pages.
(Continued)

*Primary Examiner* — Kan Yuen
(74) *Attorney, Agent, or Firm* — Maier & Maier, PLLC

(57) ABSTRACT

An uplink dynamic grant-free transmission method and an apparatus, and relates to the field of communications technologies. The method includes: a terminal receives downlink control information sent by a base station, where the downlink control information includes a plurality of pieces of indication information, each piece of indication information corresponds to one type 2 configured grant configuration, the indication information is used to indicate the terminal to perform an operation on the type 2 configured grant configuration corresponding to the indication information, and the operation includes: activating, deactivating, or maintaining a state; and then the terminal performs corresponding operations on the plurality of type 2 configured grant configurations based on the downlink control information.

17 Claims, 13 Drawing Sheets

(51) Int. Cl.
*H04W 72/0446* (2023.01)
*H04W 72/0453* (2023.01)

(58) Field of Classification Search
CPC .... H04W 24/04; H04L 5/0098; H04L 5/0048; H04L 5/0053
See application file for complete search history.

(56) References Cited

U.S. PATENT DOCUMENTS

| | | |
|---|---|---|
| 2018/0139774 A1 | 5/2018 | Ma et al. |
| 2018/0176945 A1 | 6/2018 | Cao et al. |
| 2019/0222404 A1* | 7/2019 | Ang ...................... H04L 5/0096 |
| 2019/0289513 A1* | 9/2019 | Jeon ...................... H04L 5/0098 |
| 2019/0289638 A1* | 9/2019 | Kung ................. H04W 74/0833 |
| 2019/0373588 A1* | 12/2019 | Bae ...................... H04W 76/27 |
| 2020/0100252 A1* | 3/2020 | Li ...................... H04W 72/0466 |
| 2021/0045181 A1* | 2/2021 | Li ........................... H04L 5/0016 |
| 2021/0314982 A1* | 10/2021 | Panteleev ............. H04L 5/0053 |
| 2021/0315001 A1* | 10/2021 | Matsumura ........... H04W 72/23 |
| 2021/0410177 A1* | 12/2021 | Takeda ................ H04W 72/044 |

FOREIGN PATENT DOCUMENTS

| | | |
|---|---|---|
| CN | 107872298 A | 4/2018 |
| CN | 108282879 A | 7/2018 |
| WO | 2018107944 A1 | 6/2018 |
| WO | 2018127201 A1 | 7/2018 |

OTHER PUBLICATIONS

Oppo and Qualcomm. "Configured grant type 2 on both SUL and UL." Athens, Greece. Feb. 26-Mar. 2, 2018. 3GPP TSG-RAN2 #101, R2-1801765. 3 pages.

ZTE and Sanechips. "Consideration on the configured grant type 2 for supporting SUL." Athens, Greece. Feb. 26-Mar. 2, 2018. Revision of R2-1801081. 3GPP TSG-RAN WG2 Meeting #101, R2-1801931. 3 pages.

Ericsson. "Confirmation of Configured Grant Activation for Multiple Aggregated Cells." Athens, Greece. Feb. 26-Mar. 2, 2018. Revision of R2-1800708. 3GPP TSG-RAN WG2 #101 NR, Tdoc R2-1803164. 6 pages.

Huawei and Hisilicon. "Correction on reconfiguration of type 2 configured Grant and DL SPS H235, H236, H238." Montreal, Canada. Jul. 2-6, 2018. 3GPP TSG-RAN WG2 Meeting 103, R2-1811966. 9 pages.

NTT Docomo, Inc., "Offline summary for AI 7.1.3.3.4 UL data transmission procedure" [online], 3GPP TSG RAN WG1 #92 R1-1803295, Feb. 27, 2018, 22 pages.

Ericsson., "Enhancement of Uplink Grant-free transmission for NR URLLC", 3GPP TSG-RAN1 Meeting #94 R1-1808149, Gothenburg, Sweden, Aug. 20-24, 2018, 8 pages.

* cited by examiner

| BWP indication information | First indication information |

FIG. 5

| BWP indication information | Second indication information 1 | Second indication information 2 | Second indication information 3 | Second indication information 4 | Second indication information 5 | ... | Second indication information n |
|---|---|---|---|---|---|---|---|

FIG. 6

| First transmission parameter bit field | First indication information |

FIG. 7

| First transmission parameter bit field | Second indication information 1 | Second indication information 2 | Second indication information 3 | Second indication information 4 | Second indication information 5 | ... | Second indication information n |

FIG. 8

UPLINK DYNAMIC GRANT-FREE TRANSMISSION METHOD AND APPARATUS

CROSS-REFERENCE TO RELATED APPLICATIONS

This application is a continuation of International Patent Application No. PCT/CN2019/108690, filed on Sep. 27, 2019, which claims priority to Chinese Patent Application No. 201811142702.8, filed on Sep. 28, 2018. The disclosures of the aforementioned applications are hereby incorporated by reference in their entireties.

TECHNICAL FIELD

The embodiments relate to the field of communications technologies, and in particular, to an uplink dynamic grant-free transmission configuration method and an apparatus.

BACKGROUND

Uplink dynamic grant-free transmission is a method for sending uplink data in an "arrive-and-go" manner. To be specific, when a terminal needs to send data to a base station, the terminal directly sends the data to the base station by using a transmission resource, a transmission parameter, and the like that are preconfigured by the base station, and there is no need to first send a scheduling request to the base station and wait for a dynamic grant sent by the base station. Compared with a conventional "request-grant" based uplink transmission method, the uplink dynamic grant-free transmission achieves beneficial effects such as significantly reducing signaling overheads, reducing a transmission delay, and reducing power consumption of the terminal.

A new radio access technology (NR) system supports two types of uplink dynamic grant-free transmission: type 1 configured grant physical uplink shared channel (PUSCH) transmission (type 1 PUSCH transmission with a configured grant, or type 1 configured grant configuration, or type 1 configured grant PUSCH transmission) and type 2 configured grant PUSCH transmission (type 2 PUSCH transmission with a configured grant, or type 2 configured grant configuration, or type 2 configured grant PUSCH transmission).

A type 2 configured grant PUSCH transmission configuration manner includes the following two steps: First, a base station configures, for a terminal by using a higher layer parameter, transmission resources and transmission parameters including a time domain resource period, an open-loop power control related parameter, a waveform, a redundancy version sequence, a quantity of repetitions, a frequency hopping mode, a resource allocation type, a quantity of hybrid automatic repeat request (HARQ) processes, a demodulation reference signal related parameter, a modulation and coding scheme (MCS) table, a resource block group (RBG) size, and the like; and then the base station sends, to the terminal, downlink control information (DCI) (for example, configuration-specific DCI) scrambled by using a configured scheduling (CS)-radio network temporary identifier (RNTI), so that the terminal activates the type 2 configured grant PUSCH transmission; and configures transmission resources and transmission parameters including a time domain resource, a frequency domain resource, a demodulation reference signal (DMRS), an MCS, and the like. It should be noted that, the type 2 configured grant PUSCH transmission can be used only after being activated.

The NR system supports configuration of a plurality of type 2 configured grant PUSCH transmissions on each bandwidth part (BWP). However, the configuration-specific DCI can only enable the terminal to activate/deactivate one type 2 configured grant PUSCH transmission. Therefore, to use a plurality of type 2 configured grant PUSCH transmissions on one BWP, the base station needs to deliver a plurality of pieces of DCI to the terminal, so that the terminal activates/deactivates the plurality of type 2 configured grant PUSCH transmissions on the BWP. However, in this way, signaling overheads between the base station and the terminal are relatively high.

SUMMARY

The embodiments provide an uplink dynamic grant-free transmission configuration method and an apparatus, to resolve a problem that excessively high signaling overheads are caused because a base station delivers DCI for a plurality of times in a process of configuring uplink dynamic grant-free transmission.

To achieve the foregoing objective, the embodiments provide the following solutions:

According to a first aspect, an uplink dynamic grant-free transmission configuration method is provided, including: a terminal receives downlink control information, where the downlink control information includes a plurality of pieces of indication information, each piece of indication information corresponds to one type 2 configured grant configuration, the indication information is used to indicate the terminal to perform an operation on the type 2 configured grant configuration corresponding to the indication information, and the operation includes: activating, deactivating, or maintaining a state; and then the terminal performs corresponding operations on the plurality of type 2 configured grant configurations based on the downlink control information. It can be understood that, based on the solution provided in the embodiments, in a process of configuring uplink dynamic grant-free transmission, a network device delivers one piece of downlink control information, so that the terminal can activate/deactivate a plurality of type 2 configured grant configurations, thereby reducing signaling overheads between the network device and the terminal.

In an example, the indication information includes a first bit field and a second bit field; and that the indication information is used to indicate the terminal to perform the operation on the type 2 configured grant configuration corresponding to the indication information includes at least one of the following cases:

(1) if a value of the first bit field is a first preset value, the indication information is used to indicate the terminal to activate the type 2 configured grant configuration corresponding to the indication information;

(2) if a value of the first bit field is a second preset value, and a value of the second bit field is a third preset value, the indication information is used to indicate the terminal to deactivate the type 2 configured grant configuration corresponding to the indication information; or (3) if a value of the first bit field is a second preset value, and a value of the second bit field is not a third preset value, the indication information is used to indicate the terminal to maintain a state of the type 2 configured grant configuration corresponding to the indication information.

Optionally, the second bit field is used to indicate a time domain offset value of the type 2 configured grant configuration corresponding to the indication information.

In a possible implementation, the indication information is further used to indicate one or more of the following parameters: a demodulation reference signal, a modulation and coding scheme, and a time-frequency resource.

In a possible implementation, before the terminal receives the downlink control information, the method further includes: the terminal receives configuration information of the downlink control information. That the terminal receives the downlink control information includes: the terminal receives the downlink control information based on the configuration information of the downlink control information.

In a possible implementation, the configuration information of the downlink control information includes at least one or more of the following parameters: a radio network temporary identifier; a payload size of the downlink control information; a first serving cell list, where the first serving cell list is used to indicate a serving cell to which the downlink control information is applied; and a second serving cell list, where the second serving cell list is used to indicate a serving cell to which the downlink control information is not applied.

In a possible implementation, before the terminal receives the downlink control information, the method further includes: the terminal receives first BWP indication information, where the first BWP indication information is used to indicate the terminal to use a second BWP; the terminal deactivates a first BWP, and suspends all type 2 configured grants in an active state on the first BWP, where the first BWP is a BWP used by the terminal before the terminal receives the first BWP indication information; the terminal activates the second BWP; the terminal receives second BWP indication information, where the second BWP indication information is used to indicate the terminal to use the first BWP; and the terminal deactivates the second BWP, and activates the first BWP. If the downlink control information is used to indicate the terminal to activate a plurality of target type 2 configured grants on the first BWP, that the terminal performs the corresponding operations on the plurality of type 2 configured grant configurations based on the downlink control information includes: the terminal activates the plurality of target type 2 configured grants on the first BWP, where the target type 2 configured grant is a type 2 configured grant that is in the active state on the first BWP before the terminal receives the first BWP indication information. Based on the foregoing solution, the network device delivers only one piece of downlink control information, so that the terminal can reactivate a plurality of previously used type 2 configured grants, thereby helping greatly reduce signaling overheads in a process of frequent BWP switching.

In a possible implementation, before the terminal receives the downlink control information, the method further includes: the terminal receives first BWP indication information, where the first BWP indication information is used to indicate the terminal to use a second BWP; the terminal deactivates a first BWP, and suspends all type 2 configured grants in an active state on the first BWP, where the first BWP is a BWP used by the terminal before the terminal receives the first BWP indication information; and the terminal activates the second BWP. If the downlink control information includes second BWP indication information, where the second BWP indication information is used to indicate the terminal to use the first BWP, after the terminal receives the downlink control information, the method further includes: the terminal deactivates the second BWP, and activates the first BWP. If the downlink control information is used to indicate the terminal to activate a plurality of target type 2 configured grants on the first BWP, that the terminal performs the corresponding operations on the plurality of type 2 configured grant configurations based on the downlink control information includes: the terminal activates the plurality of target type 2 configured grants on the first BWP, where the target type 2 configured grant is a type 2 configured grant that is in the active state on the first BWP before the terminal receives the first BWP indication information. Based on the foregoing solution, on the one hand, because the downlink control information includes the second BWP indication information, the network device may indicate, by using the downlink control information, the terminal to perform BWP switching, and does not need to use other signaling to indicate the terminal to perform BWP switching, thereby reducing signaling overheads in a system. On the other hand, the network device delivers only one piece of downlink control information, so that the terminal can reactivate a plurality of previously used type 2 configured grants, thereby helping greatly reduce signaling overheads in a process of frequent BWP switching.

According to a second aspect, an uplink dynamic grant-free transmission configuration method is provided, including: a network device generates downlink control information, where the downlink control information includes a plurality of pieces of indication information, each piece of indication information corresponds to one type 2 configured grant configuration, the indication information is used to indicate a terminal to perform an operation on the type 2 configured grant configuration corresponding to the indication information, and the operation includes: activating, deactivating, or maintaining a state; and the network device sends the downlink control information to the terminal. It can be understood that, based on the solution provided in the embodiments, in a process of configuring uplink dynamic grant-free transmission, the network device delivers one piece of downlink control information, so that the terminal can activate/deactivate a plurality of type 2 configured grant configurations, thereby reducing signaling overheads between the network device and the terminal.

In an example, the indication information includes a first bit field and a second bit field; and that the indication information is used to indicate the terminal to perform the operation on the type 2 configured grant configuration corresponding to the indication information includes at least one of the following cases:
  (1) if a value of the first bit field is a first preset value, the indication information is used to indicate the terminal to activate the type 2 configured grant configuration corresponding to the indication information;
  (2) if a value of the first bit field is a second preset value, and a value of the second bit field is a third preset value, the indication information is used to indicate the terminal to deactivate the type 2 configured grant configuration corresponding to the indication information; or
  (3) if a value of the first bit field is a second preset value, and a value of the second bit field is not a third preset value, the indication information is used to indicate the terminal to maintain a state of the type 2 configured grant configuration corresponding to the indication information.

Optionally, the second bit field is used to indicate a time domain offset value of the type 2 configured grant configuration corresponding to the indication information.

In a possible implementation, the indication information is further used to indicate one or more of the following parameters: a demodulation reference signal, a modulation and coding scheme, and a time-frequency resource.

In a possible implementation, the downlink control information includes BWP indication information, and the BWP indication information is used to indicate a BWP that needs to be used by the terminal. In this way, the network device may indicate, by using the DCI, the terminal to perform BWP switching, and does not need to use other signaling to indicate the terminal to perform BWP switching, thereby reducing signaling overheads.

In a possible implementation, before the network device sends the downlink control information to the terminal, the method further includes: the network device sends configuration information of the downlink control information to the terminal. This helps the terminal successfully receive the downlink control information based on the configuration information of the downlink control information.

In a possible implementation, the configuration information of the downlink control information includes at least one or more of the following parameters: a radio network temporary identifier; a payload size of the downlink control information; a first serving cell list, where the first serving cell list is used to indicate a serving cell to which the downlink control information is applied; and a second serving cell list, where the second serving cell list is used to indicate a serving cell to which the downlink control information is not applied.

According to a third aspect, a terminal is provided, including: a receiving module, configured to receive downlink control information, where the downlink control information includes a plurality of pieces of indication information, each piece of indication information corresponds to one type 2 configured grant configuration, the indication information is used to indicate the terminal to perform an operation on the type 2 configured grant configuration corresponding to the indication information, and the operation includes: activating, deactivating, or maintaining a state; and a processing module, configured to perform corresponding operations on the plurality of type 2 configured grant configurations based on the downlink control information.

In an example, the indication information includes a first bit field and a second bit field; and that the indication information is used to indicate the terminal to perform the operation on the type 2 configured grant configuration corresponding to the indication information includes at least one of the following cases:

(1) if a value of the first bit field is a first preset value, the indication information is used to indicate the terminal to activate the type 2 configured grant configuration corresponding to the indication information;

(2) if a value of the first bit field is a second preset value, and a value of the second bit field is a third preset value, the indication information is used to indicate the terminal to deactivate the type 2 configured grant configuration corresponding to the indication information; or (3) if a value of the first bit field is a second preset value, and a value of the second bit field is not a third preset value, the indication information is used to indicate the terminal to maintain a state of the type 2 configured grant configuration corresponding to the indication information.

Optionally, the second bit field is used to indicate a time domain offset value of the type 2 configured grant configuration corresponding to the indication information.

In a possible implementation, the indication information is further used to indicate one or more of the following parameters: a demodulation reference signal, a modulation and coding scheme, and a time-frequency resource.

In a possible implementation, the receiving module is further configured to receive configuration information of the downlink control information; and the processing module is further configured to receive the downlink control information based on the configuration information that is of the downlink control information and that is received by the receiving module.

In a possible implementation, the configuration information of the downlink control information includes at least one or more of the following parameters: a radio network temporary identifier; a payload size of the downlink control information; a first serving cell list, where the first serving cell list is used to indicate a serving cell to which the downlink control information is applied; and a second serving cell list, where the second serving cell list is used to indicate a serving cell to which the downlink control information is not applied.

In a possible implementation, the receiving module is further configured to receive first BWP indication information, where the first BWP indication information is used to indicate the terminal to use a second BWP; the processing module is further configured to: deactivate a first BWP, and suspend all type 2 configured grants in an active state on the first BWP, where the first BWP is a BWP used by the terminal before the terminal receives the first BWP indication information; the processing module is further configured to activate the second BWP; the receiving module is further configured to receive second BWP indication information, where the second BWP indication information is used to indicate the terminal to use the first BWP; the processing module is further configured to: deactivate the second BWP, and activate the first BWP; and the processing module is further configured to: if the downlink control information is used to indicate the terminal to activate a plurality of target type 2 configured grants on the first BWP, activate the plurality of target type 2 configured grants on the first BWP, where the target type 2 configured grant is a type 2 configured grant that is in the active state on the first BWP before the terminal receives the first BWP indication information.

In a possible implementation, the receiving module is further configured to receive first BWP indication information, where the first BWP indication information is used to indicate the terminal to use a second BWP; the processing module is further configured to: deactivate a first BWP, and suspend all type 2 configured grants in an active state on the first BWP, where the first BWP is a BWP used by the terminal before the terminal receives the first BWP indication information; the processing module is further configured to activate the second BWP; the processing module is further configured to: if the downlink control information includes second BWP indication information, deactivate the second BWP, and activate the first BWP, where the second BWP indication information is used to indicate the terminal to use the first BWP; and the processing module is further configured to: if the downlink control information is used to indicate the terminal to activate a plurality of target type 2 configured grants on the first BWP, activate the plurality of target type 2 configured grants on the first BWP, where the target type 2 configured grant is a type 2 configured grant that is in the active state on the first BWP before the terminal receives the first BWP indication information.

According to a fourth aspect, a terminal is provided, including: a processor and a memory. The memory is configured to store a computer-executable instruction; and when the terminal runs, the processor executes the computer-executable instruction stored in the memory, and the terminal is enabled to perform the uplink dynamic grant-free transmission configuration method according to the first aspect.

According to a fifth aspect, a computer-readable storage medium is provided. The computer-readable storage medium stores an instruction, and when the instruction is run on a computer, the computer is enabled to perform the uplink dynamic grant-free transmission configuration method according to the first aspect.

According to a sixth aspect, a computer program product including an instruction is provided. When the computer program product runs on a computer, the computer is enabled to perform the uplink dynamic grant-free transmission configuration method according to the first aspect.

According to a seventh aspect, a chip system is provided. The chip system includes a processor, configured to support a terminal in implementing a function of the uplink dynamic grant-free transmission configuration method according to the first aspect. In a possible implementation, the chip system further includes a memory. The memory is configured to store a program instruction and data that are necessary for the terminal. The chip system may include a chip or may include a chip and another discrete component.

For effects achieved by any one of the implementation manners of the third aspect to the seventh aspect, refer to effects achieved by different implementation manners of the first aspect. Details are not described herein again.

According to an eighth aspect, a network device is provided, including a processing module configured to generate downlink control information, where the downlink control information includes a plurality of pieces of indication information, each piece of indication information corresponds to one type 2 configured grant configuration, the indication information is used to indicate a terminal to perform an operation on the type 2 configured grant configuration corresponding to the indication information, and the operation includes: activating, deactivating, or maintaining a state; and a sending module, configured to send the downlink control information to the terminal.

In an example, the indication information includes a first bit field and a second bit field; and that the indication information is used to indicate the terminal to perform the operation on the type 2 configured grant configuration corresponding to the indication information includes at least one of the following cases:

(1) if a value of the first bit field is a first preset value, the indication information is used to indicate the terminal to activate the type 2 configured grant configuration corresponding to the indication information;

(2) if a value of the first bit field is a second preset value, and a value of the second bit field is a third preset value, the indication information is used to indicate the terminal to deactivate the type 2 configured grant configuration corresponding to the indication information; or (3) if a value of the first bit field is a second preset value, and a value of the second bit field is not a third preset value, the indication information is used to indicate the terminal to maintain a state of the type 2 configured grant configuration corresponding to the indication information.

Optionally, the second bit field is used to indicate a time domain offset value of the type 2 configured grant configuration corresponding to the indication information.

In a possible implementation, the indication information is further used to indicate one or more of the following parameters: a demodulation reference signal, a modulation and coding scheme, and a time-frequency resource.

In a possible implementation, the downlink control information includes BWP indication information, and the BWP indication information is used to indicate a BWP that needs to be used by the terminal.

In a possible implementation, the sending module is further configured to send configuration information of the downlink control information to the terminal.

In a possible implementation, the configuration information of the downlink control information includes at least one or more of the following parameters: a radio network temporary identifier; a payload size of the downlink control information; a first serving cell list, where the first serving cell list is used to indicate a serving cell to which the downlink control information is applied; and a second serving cell list, where the second serving cell list is used to indicate a serving cell to which the downlink control information is not applied.

According to a ninth aspect, a network device is provided, including a processor and a memory. The memory is configured to store a computer-executable instruction; and when the network device runs, the processor executes the computer-executable instruction stored in the memory, and the network device is enabled to perform the uplink dynamic grant-free transmission configuration method according to the second aspect.

According to a tenth aspect, a computer-readable storage medium is provided. The computer-readable storage medium stores an instruction, and when the instruction is run on a computer, the computer is enabled to perform the uplink dynamic grant-free transmission configuration method according to the second aspect.

According to an eleventh aspect, a computer program product including an instruction is provided. When the computer program product runs on a computer, the computer is enabled to perform the uplink dynamic grant-free transmission configuration method according to the second aspect.

According to a twelfth aspect, a chip system is provided. The chip system includes a processor configured to support a network device in implementing a function of the uplink dynamic grant-free transmission configuration method according to the second aspect. In a possible implementation, the chip system further includes a memory. The memory is configured to store a program instruction and data that are necessary for the network device. The chip system may include a chip or may include a chip and another discrete component.

For effects achieved by any one of the implementation manners of the eighth aspect to the twelfth aspect, refer to effects achieved by different implementation manners of the second aspect. Details are not described herein again.

BRIEF DESCRIPTION OF DRAWINGS

FIG. 5 is a second schematic diagram of group DCI according to an embodiment;

FIG. 6 is a third schematic diagram of group DCI according to an embodiment

FIG. 7 is a fourth schematic diagram of group DCI according to an embodiment;

FIG. 8 is a fifth schematic diagram of group DCI according to an embodiment;

DETAILED DESCRIPTION OF THE EMBODIMENTS

Figure 1:
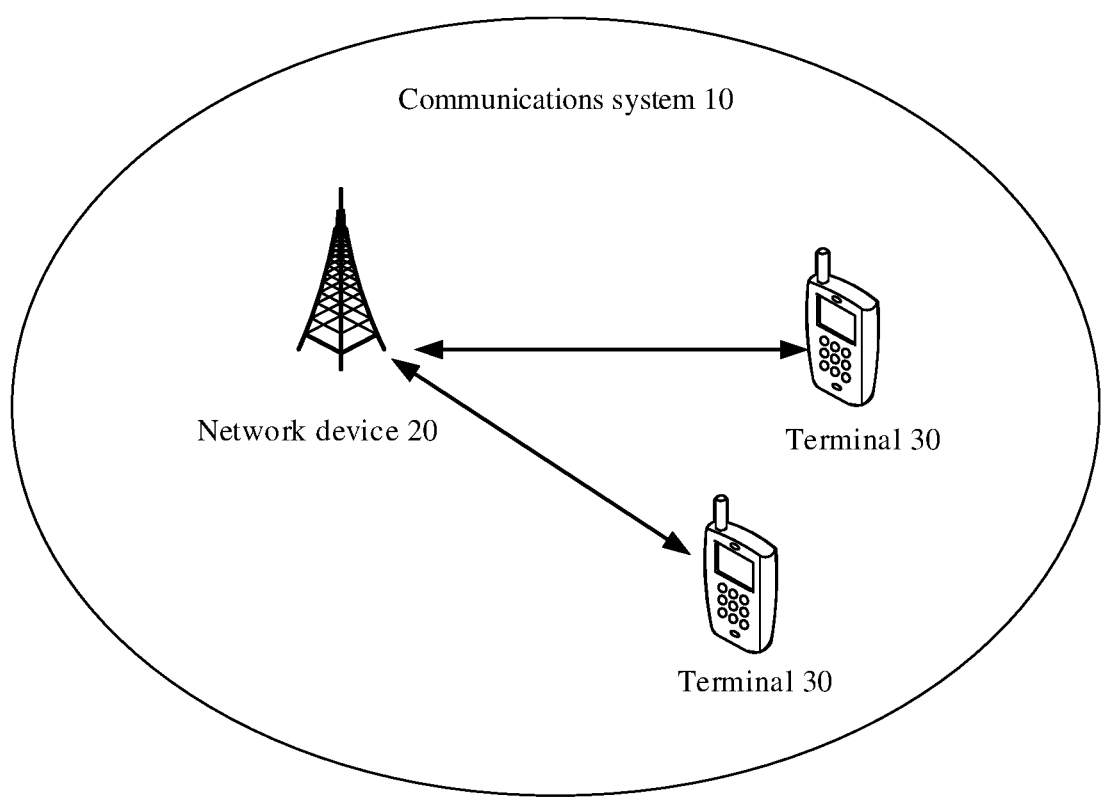
FIG. 1 is a schematic architectural diagram of a communications system according to an embodiment.

The following briefly describes some concepts related to the embodiments before a method provided in the embodiments is described.

(1) BWP

Because transmit or receive capabilities of different terminals in a same serving cell may be different, a corresponding bandwidth may be configured for each terminal in a system. This part of bandwidth configured for the terminal is referred to as a BWP. The BWP may be understood as an operating bandwidth of the terminal, and the terminal transmits or receives data on a BWP of the terminal.

One or more BWPs may be configured for the terminal in the same serving cell. It should be noted that different subcarrier spacings (SCS), cyclic prefixes (CP), and the like may be used on different BWPs, to adapt to different types of services.

(2) Time Domain Offset Value

The time domain offset value is used to determine a position of a time domain resource used for uplink dynamic grant-free transmission. For example, if the terminal receives DCI in a slot n, and a time domain offset value carried in the DCI is k slots, a start slot of a time domain resource used for uplink dynamic grant-free transmission is a slot n+k.

(3) Uplink Dynamic Grant-Free Transmission

Uplink dynamic grant-free transmission: uplink transmission of the terminal can be completed without scheduling by a network device. For example, when uplink data arrives, the terminal does not need to send a scheduling request (SR) to the network device and waits for a dynamic grant of the network device, but may directly send the uplink data to the network device by using a transmission resource preallocated by the network device and a specified transmission parameter.

In NR, there may be two types of uplink dynamic grant-free transmission, namely, type 1 configured grant PUSCH transmission and type 2 configured grant PUSCH transmission.

The network device may configure a configured grant configuration by using higher layer signaling, for example, a configured grant configuration control element (ConfiguredGrantConfig information element or ConfiguredGrantConfig IE) carried in a radio resource control (RRC) message. The terminal may determine, based on a parameter configured in the ConfiguredGrantConfig IE, whether a configured grant configuration configured by using the ConfiguredGrantConfig IE is a type 1 configured grant configuration (type 1 configured grant configuration) or a type 2 configured grant configuration (type 2 configured grant configuration).

The following describes the two types of uplink dynamic grant-free transmission in detail.

In the type 1 configured grant PUSCH transmission, parameters configured in a type 1 configured grant configuration include, for example, all transmission resources and transmission parameters including a time domain resource period, an open-loop power control related parameter, a waveform, a redundancy version sequence, a quantity of repetitions, a frequency hopping mode, a resource allocation type, a quantity of HARQ processes, a DMRS related parameter, an MCS table, an RBG size, a time domain resource, a frequency domain resource, and an MCS. After receiving the higher layer parameter, the terminal may directly transmit a PUSCH on a configured time-frequency resource by using the configured transmission parameter. Therefore, this transmission scheme may also be referred to as a fully RRC-configured uplink grant (fully RRC-configured UL grant).

In the type 2 configured grant PUSCH transmission, parameters configured in a type 2 configured grant configuration may include, for example, transmission resources and transmission parameters including a time-frequency resource period, an open-loop power control related parameter, a waveform, a redundancy version sequence, a quantity of repetitions, a frequency hopping mode, a resource allocation type, a quantity of HARQ processes, a DMRS related parameter, an MCS table, and an RBG group size. In an example, for specific parameters configured in the type 2 configured grant configuration, refer to related content in 3GPP TS38.331. Then the network device may activate a type 2 configured grant configuration by using DCI, to perform PUSCH transmission. The DCI may carry an index of the activated type 2 configured grant configuration. Other transmission resources and transmission parameters including a time domain resource, a frequency domain resource, a DMRS, an MCS, and the like may be further configured by using the DCI. Therefore, after receiving the higher layer parameter, the terminal cannot immediately perform PUSCH transmission. Instead, the terminal can determine the activated type 2 configured grant configuration only after receiving the DCI, and transmit, with reference to the transmission resource and the transmission parameter that are indicated in the DCI, a PUSCH on a configured time-frequency resource based on the configured transmission parameter. The network device may activate the type 2 configured grant configuration by using, for example, DCI format 0_0/0_1.

In other words, that the terminal activates a type 2 configured grant configuration is that a parameter in the type 2 configured grant configuration is made valid. The terminal may determine, with reference to the parameter in the type 2 configured grant configuration and a parameter in the DCI for activating the configured grant configuration, the transmission resource and the transmission parameter that are used to transmit the PUSCH, to perform PUSCH transmission. Therefore, when a configured grant configuration is activated by using DCI, it may be considered that the DCI is used to activate dynamic grant-free transmission based on the type 2 configured grant configuration.

In addition, the network device may alternatively deactivate a type 2 configured grant configuration by using DCI. For example, the DCI may carry an index of the deactivated type 2 configured grant configuration. The terminal may determine the deactivated type 2 configured grant configuration based on the index. The network device may deactivate the type 2 configured grant configuration by using, for example, the DCI format 0_0.

In other words, that the terminal deactivates (or releases) a type 2 configured grant configuration is that a parameter in the type 2 configured grant configuration is made invalid, so that the terminal cannot perform uplink dynamic grant-free transmission based on the type 2 configured grant configuration. Therefore, when a configured grant configuration is deactivated by using DCI, it may be considered that the DCI is used to deactivate uplink dynamic grant-free transmission based on the type 2 configured grant configuration.

In the embodiments, the terminal deactivates a type 2 configured grant configuration in two manners: In one manner, the terminal suspends the type 2 configured grant configuration, that is, a parameter in the type 2 configured grant configuration is made invalid, but the terminal still stores a transmission resource and a transmission parameter that are indicated in DCI. In this way, if a base station redelivers DCI to reactivate the type 2 configured grant configuration in a suspended state, the DCI may not carry indication information of other transmission resources and transmission parameters including a time domain resource, a frequency domain resource, a DMRS, an MCS, and the like, to reduce transmission overheads. In the other manner, the terminal clears the type 2 configured grant configuration, that is, a related parameter in the type 2 configured grant configuration is made invalid, and the terminal does not store a transmission resource and a transmission parameter that are indicated in DCI. In this way, if a base station redelivers DCI to reactivate the type 2 configured grant configuration in a suspended state, the DCI needs to carry indication information of other transmission resources and transmission parameters including a time domain resource, a frequency domain resource, a DMRS, an MCS, and the like, so that the terminal can perform uplink dynamic grant-free transmission by using the type 2 configured grant configuration.

In the embodiments, unless otherwise specified, "/" means "or". For example, A/B may represent A or B. The term "and/or" is only an association relationship for describing associated objects and represents that there may be three relationships. For example, A and/or B may represent the following three cases: only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

In the embodiments, the term "indication" may include a direct indication and an indirect indication, or may include an explicit indication and an implicit indication. Information indicated by a piece of information (for example, configuration information described below) is referred to as to-be-indicated information. In a specific implementation process, there are a plurality of manners of indicating the to-be-indicated information, for example, but not limited to, the following manners: the to-be-indicated information is directly indicated, for example, the to-be-indicated information or an index of the to-be-indicated information is indicated. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is known or agreed on in advance. For example, specific information may alternatively be indicated by using an arrangement sequence of a plurality of pieces of information that is pre-agreed on (for example, stipulated in a protocol), to reduce indication overheads to some extent.

It should be noted that words, such as "example" or "for example", are used to represent giving an example, an illustration, or a description. Any embodiment or design scheme described as an "example" or "for example" in the embodiments should not be explained as being more preferred or having more advantages than another embodiment or design scheme. Exactly, use of the word such as "example" or "for example" is intended to present a related concept in a specific manner.

In addition, a network architecture and a service scenario that are described in the embodiments are intended to describe the solutions in the embodiments more clearly, and do not limit solutions provided in the embodiments. A person of ordinary skill in the art may understand that with evolution of the network architecture and emergence of a new service scenario, the solutions provided in the embodiments are also applicable to similar problems.

The solutions provided in the embodiments may be applied to various communications systems, for example, an NR communications system using a 5th generation (5G) communications technology, a future evolved system, or a plurality of convergent communications systems. The solutions provided in the embodiments may be applied to a plurality of application scenarios, for example, machine to machine (M2M), macro-micro communications, enhanced mobile broadband (eMBB), ultra-reliable and low-latency communications (uRLLC), and massive machine-type communications (mMTC).

FIG. 1 is a schematic diagram of a communications system to which the solutions provided in the embodiments are applicable. The communications system 10 may include one or more network devices 20 (only one network device is shown) and one or more terminals 30 connected to each network device 20. FIG. 1 is merely a schematic diagram and does not constitute a limitation on a scenario to which the solutions provided in the embodiments are applicable.

The network device 20 may be a base station, a base station controller, or the like in wireless communications. The base station may include various types of base stations, such as a micro base station (also referred to as a small cell), a macro base station, a relay node, and an access point. This is not limited in the embodiments. In the embodiments, the base station may be an evolved NodeB (eNB or e-NodeB) in LTE, an eNB in the Internet of Things (IoT) or the narrowband Internet of Things (NB-IoT), or a base station in a 5G mobile communications network or a future evolved public land mobile network (PLMN). This is not limited in the embodiments.

The terminal 30 is configured to provide a voice and/or data connectivity service for a user. The terminal 30 may have different names, for example, user equipment (UE), an access terminal, a terminal unit, a terminal station, a mobile station, a mobile console, a remote station, a remote terminal, a mobile device, a wireless communications device, a terminal agent, or a terminal apparatus. Optionally, the terminal 30 may be various handheld devices, vehicle-mounted devices, wearable devices, or computers that have a communication function. This is not limited in the embodiments. For example, the handheld device may be a smartphone. The vehicle-mounted device may be an in-vehicle navigation system. The wearable device may be a smart band. The computer may be a personal digital assistant (PDA) computer, a tablet computer, or a laptop computer.

Figure 2:
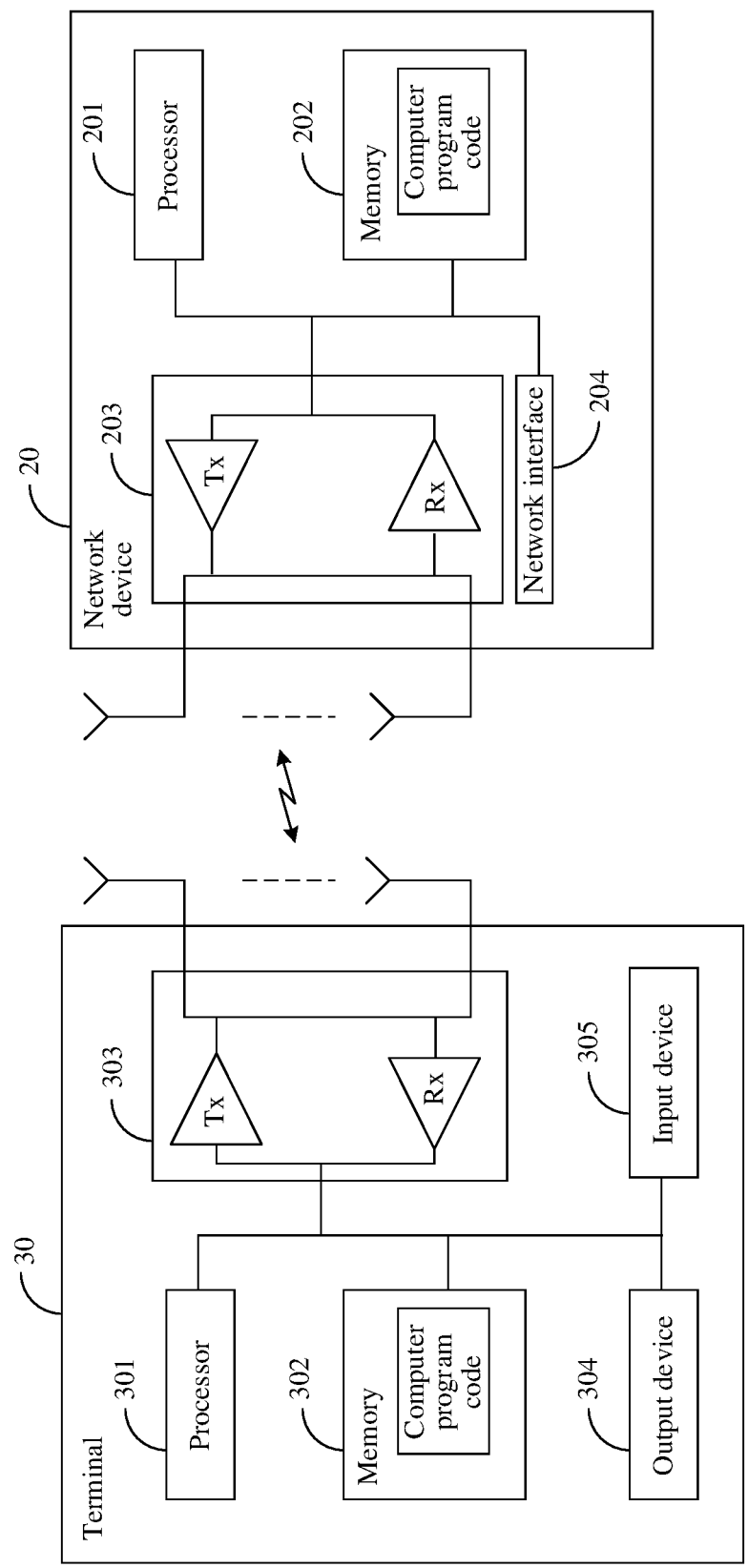
FIG. 2 is a schematic diagram of hardware structures of a terminal and a network device according to an embodiment.

FIG. 2 is a schematic diagram of hardware structures of the network device 20 and the terminal 30 according to an embodiment.

The terminal 30 includes at least one processor 301, at least one memory 302, and at least one transceiver 303. Optionally, the terminal 30 may further include an output device 304 and an input device 305.

The processor 301, the memory 302, and the transceiver 303 are connected by using a bus. The processor 301 may be a general-purpose central processing unit ( ), a microprocessor, an application-specific integrated circuit ( ), or one or more integrated circuits for controlling program execution of the solutions in the embodiments. The processor 301 may alternatively include a plurality of CPUs, and the processor 301 may be a single-core (single-CPU) processor or a multi-core (multi-CPU) processor. The processor herein may refer to one or more devices, circuits, or processing cores configured to process data (for example, a computer program instruction).

The memory 302 may be a read-only memory (ROM) or another type of static storage device that can store static information and an instruction, or a random access memory (RAM) or another type of dynamic storage device that can store information and an instruction; or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. This is not limited in the embodiments. The memory 302 may exist independently and is connected to the processor 301 by using the bus. The memory 302 may alternatively be integrated with the processor 301. The memory 302 is configured to store application program code for performing the solutions in the embodiments, and the application program code is executed under control of the processor 301. The processor 301 is configured to execute computer program code stored in the memory 302, to implement the method provided in the embodiments.

The transceiver 303 may use any apparatus, such as a transceiver, and is configured to communicate with another device or a communications network such as the Ethernet, a radio access network (RAN), or a wireless local area network ( ). The transceiver 303 includes a transmitter Tx and a receiver Rx.

The output device 304 communicates with the processor 301 and may display information in a plurality of manners. For example, the output device 304 may be a liquid crystal display (LCD), a light emitting diode (LED) display device, a cathode ray tube (CRT) display device, or a projector. The input device 305 communicates with the processor 30, and may receive an input of a user in a plurality of manners. For example, the input device 305 may be a mouse, a keyboard, a touchscreen device, or a sensing device.

The network device 20 includes at least one processor 201, at least one memory 202, at least one transceiver 203, and at least one network interface 204. The processor 201, the memory 202, the transceiver 203, and the network interface 204 are connected by using a bus. The network interface 204 is configured to connect to a core network device through a link (for example, an S1 interface), or connect to a network interface of an access network device through a wired or wireless link (for example, an X2 interface) (not shown in the figure). This is not limited in the embodiments. In addition, for related descriptions of the processor 201, the memory 202, and the transceiver 203, refer to the descriptions of the processor 301, the memory 302, and the transceiver 303 in the terminal 30. Details are not described herein again.

Figure 3:
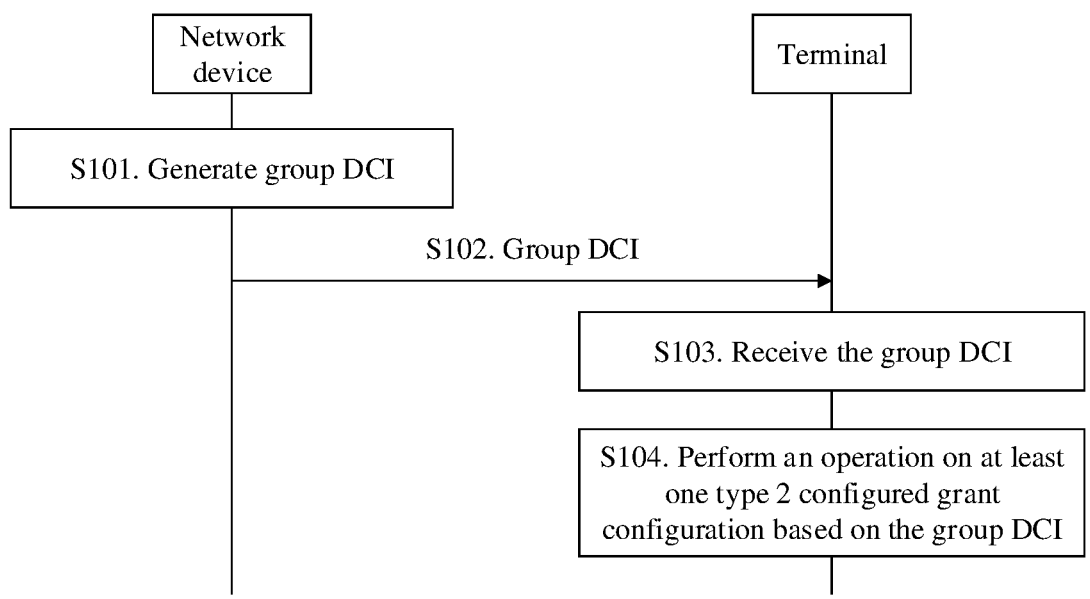
FIG. 3 is a first flowchart of an uplink dynamic grant-free transmission configuration method according to an embodiment.

As shown in FIG. 3, an embodiment provides an uplink dynamic grant-free transmission configuration method, including the following steps.

S101. A network device generates group DCI. The group DCI is used to indicate a terminal to perform an operation on at least one type 2 configured grant configuration.

It should be noted that the group DCI is merely an example name and does not constitute any limitation. The group DCI may also have another name, for example, DCI format 2_x or DCI format x. This is not limited in this embodiment.

The operation includes: activating, deactivating, or maintaining a state.

In this embodiment, the type 2 configured grant configuration has the following three states: an active state, an inactive state, and a suspended state. When the type 2 configured grant configuration is in the active state, the terminal can perform uplink dynamic grant-free transmission by using the type 2 configured grant configuration. When the type 2 configured grant configuration is in the inactive state or the suspended state, the terminal cannot perform uplink dynamic grant-free transmission by using the type 2 configured grant configuration. A difference between the suspended state and the inactive state lies in that: when the type 2 configured grant configuration is in the suspended state, the terminal stores related information that is about a transmission resource and a transmission parameter of the type 2 configured grant configuration and that is indicated by downlink control information.

Therefore, maintaining the state of the type 2 configured grant configuration means that the state of the type 2 configured grant configuration is not changed. For example, if the type 2 configured grant configuration is in the active state before the terminal receives the downlink control information, after the terminal receives the downlink control information, the type 2 configured grant configuration is also in the active state.

In an optional implementation, the group DCI includes one piece of first indication information, and the first indication information is used to indicate the terminal to perform the operation on the at least one type 2 configured grant configuration.

For example, at least one bit in the first indication information is used for indication. For example, when the at least one bit included in the first indication information is all 0, the first indication information is used to indicate the terminal to deactivate the at least one type 2 configured grant configuration. For another example, when the at least one bit included in the first indication information is all 1, the first indication information is used to indicate the terminal to activate the at least one type 2 configured grant configuration.

It should be noted that, the group DCI carries an index of the at least one type 2 configured grant configuration. Alternatively, the at least one type 2 configured grant configuration is predefined. For example, the at least one type 2 configured grant configuration includes all type 2 configured grant configurations configured on a BWP currently used by the terminal. For another example, the at least one type 2 configured grant configuration includes a type 2 configured grant configuration in the suspended state. For another example, the at least one type 2 configured grant configuration includes a type 2 configured grant configuration in the inactive state. For another example, the at least one type 2 configured grant configuration includes a type 2 configured grant configuration in the active state.

In another optional implementation, the group DCI includes at least one piece of second indication information, each piece of second indication information corresponds to one type 2 configured grant configuration, and the second indication information is used to indicate the terminal to perform an operation on the type 2 configured grant configuration corresponding to the second indication information.

It should be noted that the correspondence between the second indication information and the type 2 configured grant configuration may be indicated in an explicit manner. For example, the second indication information carries an index of the type 2 configured grant configuration, to indicate the type 2 configured grant configuration corresponding to the second indication information. Alternatively, the correspondence between the second indication information and the type 2 configured grant configuration may be indicated in an implicit manner. For example, there is a correspondence between a position of the second indication information in the group DCI and an index of the type 2 configured grant configuration, so that the terminal can determine, based on the position of the second indication information in the group DCI, the type 2 configured grant configuration corresponding to the second indication information. The correspondence between the position of the second indication information in the group DCI and the index of the type 2 configured grant configuration may be preset or may be notified by the network device to the terminal.

In an example, if the second indication information includes a first bit field and a second bit field, that the second indication information is used to indicate the terminal to perform the operation on the type 2 configured grant configuration corresponding to the second indication information includes at least one of the following cases:
  (1) if a value of the first bit field is a first preset value, the second indication information is used to indicate the terminal to activate the type 2 configured grant configuration corresponding to the second indication information;
  (2) if a value of the first bit field is a second preset value, and a value of the second bit field is a third preset value, the second indication information is used to indicate the terminal to deactivate the type 2 configured grant configuration corresponding to the second indication information; or
  (3) if a value of the first bit field is a second preset value, and a value of the second bit field is not a third preset value, the second indication information is used to indicate the terminal to maintain a state of the type 2 configured grant configuration corresponding to the second indication information.

In another example, if the second indication information includes a first bit field and a second bit field, that the second indication information is used to indicate the terminal to perform the operation on the type 2 configured grant configuration corresponding to the second indication information includes at least one of the following cases:
  (1) if a value of the first bit field is a first preset value, the second indication information is used to indicate the terminal to activate the type 2 configured grant configuration corresponding to the second indication information;
  (2) if a value of the first bit field is a second preset value, and a value of the second bit field is not a third preset value, the second indication information is used to indicate the terminal to deactivate the type 2 configured grant configuration corresponding to the second indication information; or
  (3) if a value of the first bit field is a second preset value, and a value of the second bit field is a third preset value, the second indication information is used to indicate the terminal to maintain a state of the type 2 configured grant configuration corresponding to the second indication information.

In another example, if the second indication information includes a first bit field, that the second indication information is used to indicate the terminal to perform the operation on the type 2 configured grant configuration corresponding to the second indication information includes at least one of the following cases:
  (1) if a value of the first bit field is a first preset value, the second indication information is used to indicate the terminal to activate the type 2 configured grant configuration corresponding to the second indication information;
  (2) if a value of the first bit field is a second preset value, the second indication information is used to indicate the terminal to deactivate the type 2 configured grant configuration corresponding to the second indication information; or
  (3) if a value of the first bit field is a fourth preset value, the second indication information is used to indicate the terminal to maintain a state of the type 2 configured grant configuration corresponding to the second indication information.

In another example, if the second indication information includes a second bit field, that the second indication information is used to indicate the terminal to perform the operation on the type 2 configured grant configuration corresponding to the second indication information includes at least one of the following cases:
  (1) if a value of a target bit in the second bit field is a fifth preset value, the indication information is used to indicate the terminal to deactivate the type 2 configured grant configuration corresponding to the indication information, where optionally, the target bit is a most significant bit (most significant bit, MSB);
  (2) if a value of a target bit in the second bit field is a sixth preset value, and a value of a bit other than the target bit in the second bit field is a seventh preset value, the second indication information is used to indicate the terminal to deactivate the type 2 configured grant configuration corresponding to the second indication information; or (3) if a value of a target bit in the second bit field is a sixth preset value, and a value of a bit other than the target bit in the second bit field is not a seventh preset value, the indication information is used to indicate the terminal to maintain a state of the type 2 configured grant configuration corresponding to the indication information.

In another example, if the second indication information includes a second bit field, that the second indication information is used to indicate the terminal to perform the operation on the type 2 configured grant configuration corresponding to the second indication information includes at least one of the following cases:

(1) if a value of a target bit in the second bit field is a fifth preset value, the indication information is used to indicate the terminal to deactivate the type 2 configured grant configuration corresponding to the indication information;

(2) if a value of a target bit in the second bit field is a sixth preset value, and a value of a bit other than the target bit in the second bit field is not a seventh preset value, the second indication information is used to indicate the terminal to deactivate the type 2 configured grant configuration corresponding to the second indication information; or (3) if a value of a target bit in the second bit field is a sixth preset value, and a value of a bit other than the target bit in the second bit field is a seventh preset value, the indication information is used to indicate the terminal to maintain a state of the type 2 configured grant configuration corresponding to the indication information.

In this embodiment, the second bit field may be used to indicate a time domain offset value of the type 2 configured grant configuration corresponding to the second indication information.

Figure 4:
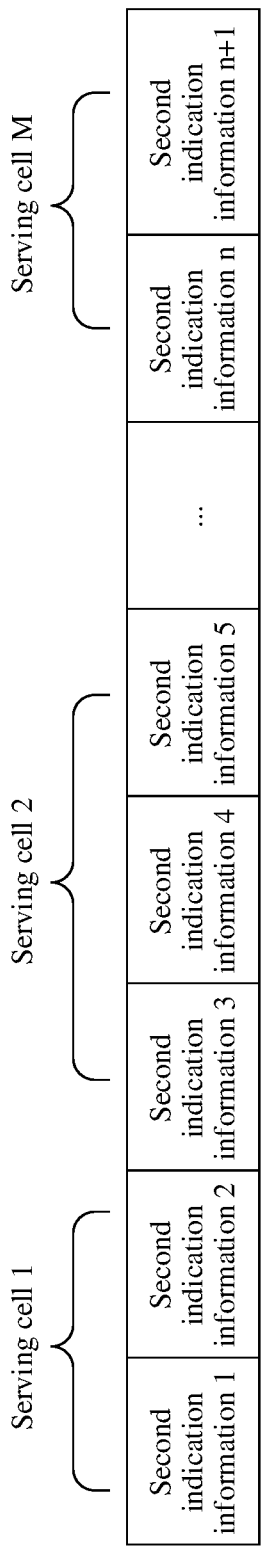
FIG. 4 is a first schematic diagram of group DCI according to an embodiment.

Optionally, the plurality of pieces of second indication information included in the group DCI respectively correspond to different serving cells. For example, as shown in FIG. 4, second indication information 1 corresponds to a serving cell 1, and the second indication information 1 is used to indicate the terminal to activate a type 2 configured grant configuration 1; and second indication information 3 corresponds to a serving cell 2, and the second indication information 3 is used to indicate the terminal to deactivate a type 2 configured grant configuration 2.

In this embodiment, the correspondence between the second indication information and the serving cell is indicated in an explicit manner. For example, the second indication information includes an identifier of the serving cell. Alternatively, the correspondence between the second indication information and the serving cell is indicated in an implicit manner. For example, there is a correspondence between a position of the second indication information in the group DCI and an identifier of the serving cell, so that the terminal can determine, based on the position of the second indication information in the group DCI, the serving cell corresponding to the second indication information. The correspondence between the position of the second indication information in the group DCI and the identifier of the serving cell may be preset or may be notified by the network device to the terminal.

In a possible implementation, as shown in FIG. 5 or FIG. 6, the group DCI may further include BWP indication information, the BWP indication information is used to indicate a BWP that needs to be used by the terminal, and the BWP indication information may include an index of the BWP. It should be noted that, if the BWP indicated by the BWP indication information is not a BWP currently used by the terminal, the terminal should deactivate the currently used BWP, and activate the BWP indicated by the BWP indication information. For example, the terminal currently uses a BWP 1, and the BWP indication information in the group DCI received by the terminal is used to indicate the terminal to use a BWP 2. In this case, the terminal deactivates the BWP 1 and activates the BWP 2. In addition, it should be noted that in a process of deactivating the BWP 1, the terminal further needs to deactivate a type 2 configured grant configuration in the active state on the BWP 1. In this way, the network device may indicate, by using the group DCI, the terminal to perform BWP switching, and does not need to use other signaling to indicate the terminal to perform BWP switching, thereby reducing signaling overheads.

In a possible implementation, the group DCI may be further used to indicate a transmission parameter of the at least one type 2 configured grant configuration. Optionally, the transmission parameter includes at least one of the following: a DMRS, an MCS, and a time-frequency resource. The time-frequency resource includes a number of a start OFDM symbol in a slot in which uplink dynamic grant-free transmission is performed, and a quantity of OFDM symbols occupied by the uplink dynamic grant-free transmission.

It should be understood that indication of the DMRS refers to indication of a related parameter configuration for generating the DMRS, rather than indication of the DMRS. For a related parameter for generating the DMRS, refer to related content in an existing NR protocol.

That the group DCI is used to indicate the transmission parameter of the at least one type 2 configured grant configuration includes at least one of the following cases.

Case 1: As shown in FIG. 7 or FIG. 8, the group DCI includes one first transmission parameter bit field, and the first transmission parameter bit field is used to indicate a transmission parameter of the at least one type 2 configured grant configuration. In other words, the transmission parameter indicated by the first transmission parameter bit field is common to the plurality of type 2 configured grant configurations.

Figure 9:
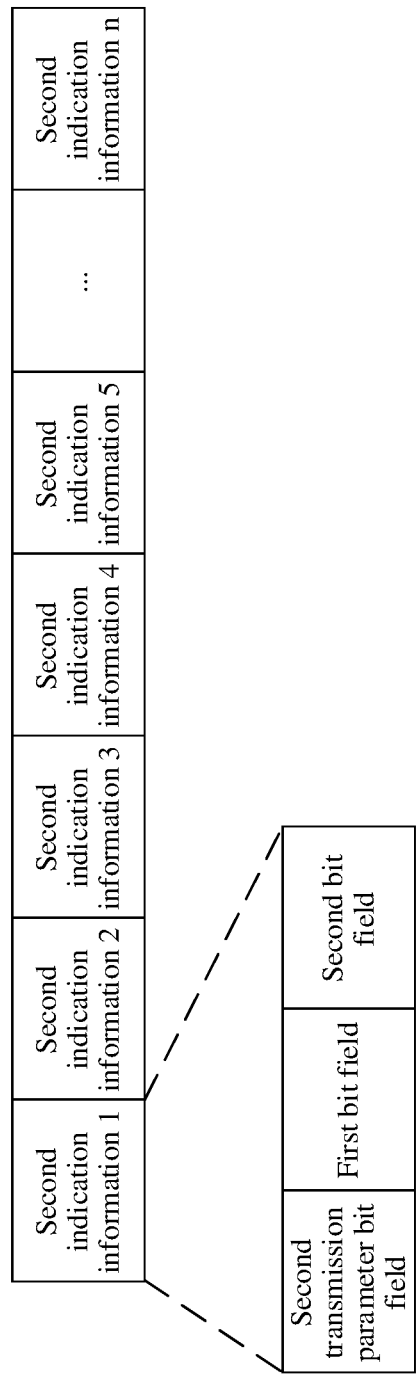
FIG. 9 is a sixth schematic diagram of group DCI according to an embodiment.

Case 2: As shown in FIG. 9, the second indication information in the group DCI may include a second transmission parameter bit field, and the second transmission parameter bit field is used to indicate a transmission parameter of the type 2 configured grant configuration corresponding to the second indication information. In other words, the transmission parameter indicated by the second transmission parameter bit field is dedicated to the type 2 configured grant configuration corresponding to the second indication information. In this embodiment, the second indication information may include the second transmission parameter bit field or may not include the second transmission bit field. This is not limited in this embodiment. For example, if the second indication information is used to indicate the terminal to deactivate the type 2 configured grant configuration, or the second indication information is used to indicate the terminal to maintain the state of the type 2 configured grant configuration, the second indication information may not include the second transmission parameter bit field, thereby reducing transmission overheads of the group DCI.

S102. The network device sends the group DCI to the terminal.

In an implementation, if the group DCI can be dedicated to the terminal, the network device sends only the group DCI to the terminal. Alternatively, if the group DCI can be common, the network device sends the group DCI to a plurality of terminals in a serving cell.

S103. The terminal receives the group DCI.

Optionally, if the group DCI is dedicated, the terminal blindly detects a PDCCH in a UE-specific search space, to obtain the group DCI. If the group DCI is common, the terminal blindly detects a PDCCH in a common search space, to obtain the group DCI.

S104. The terminal performs the operation on the at least one type 2 configured grant configuration based on the group DCI.

Based on the foregoing solution, in a process of configuring uplink dynamic grant-free transmission, the network device delivers one piece of downlink control information, so that the terminal can activate/deactivate a plurality of type 2 configured grant configurations, thereby reducing signaling overheads between the network device and the terminal.

Figure 10:
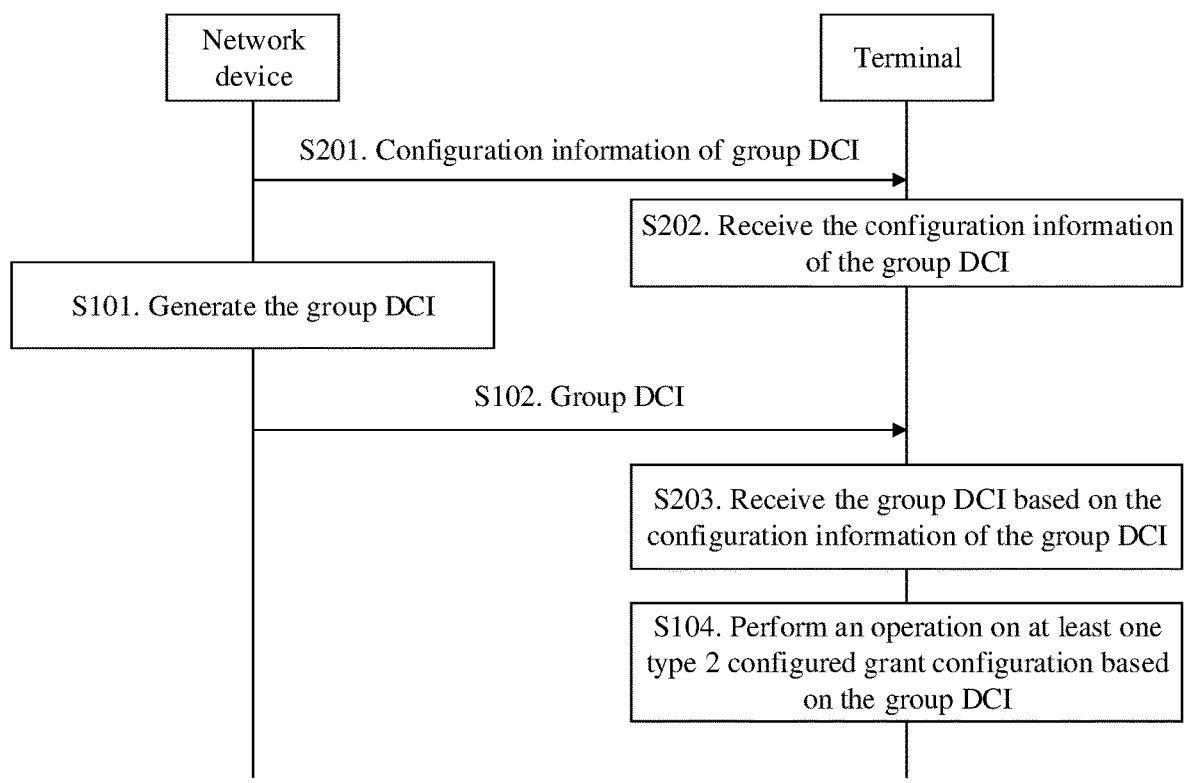
FIG. 10 is a second flowchart of an uplink dynamic grant-free transmission configuration method according to an embodiment.

In a possible implementation, as shown in FIG. 10, before step S102, the solution provided in this embodiment further includes step S201. It should be noted that, an execution sequence of step S101 and step S201 is not limited in this embodiment. In other words, the network device may first perform step S101, and then perform step S201. Alternatively, the network device first performs step S201, and then performs step S101. Alternatively, the network device simultaneously performs step S101 and step S201.

S201. The network device sends configuration information of the group DCI to the terminal.

In an optional implementation, the network device sends the configuration information of the group DCI to the terminal by using radio resource control (Radio resource control, RRC) signaling, media access control (MAC) signaling, or physical layer control signaling.

Optionally, the configuration information of the group DCI includes at least one or more of the following parameters:

(1) an RNTI;
(2) a payload size of the group DCI;
(3) a first serving cell list, where the first serving cell list is used to indicate a serving cell to which the group DCI is applied, where, in other words, the first serving cell list is used to indicate a serving cell in which the group DCI takes effect; that is, if the terminal accesses the serving cell in the first serving cell list, the terminal may perform a corresponding operation on the at least one type 2 configured grant configuration based on the group DCI; and
(4) a second serving cell list, where the second serving cell list is used to indicate a serving cell to which the group DCI is not applied, where, in other words, the second serving cell list is used to indicate a serving cell in which the group DCI does not take effect; that is, if the terminal accesses the serving cell in the second serving cell list, the terminal cannot perform a corresponding operation on the at least one type 2 configured grant configuration based on the group DCI.

It may be understood that the configuration information of the group DCI may further include another parameter. This is not limited in this embodiment.

Optionally, the second serving cell list includes a cell identifier.

Optionally, the first serving cell list includes a cell identifier and a first type 2 configured grant configuration list and/or a second type 2 configured grant configuration list. The first type 2 configured grant configuration list is used to indicate a type 2 configured grant configuration that supports application of the group DCI. That is, the terminal can perform a corresponding operation on the type 2 configured grant configuration in the first type 2 configured grant configuration list based on the group DCI. The second type 2 configured grant configuration list is used to indicate a type 2 configured grant configuration that does not support application of the group DCI. That is, the terminal cannot perform a corresponding operation on the type 2 configured grant configuration in the second type 2 configured grant configuration list based on the group DCI.

Optionally, the first type 2 configured grant configuration list includes an index of the type 2 configured grant configuration. It should be noted that, when the group DCI generated by the network device includes the at least one piece of second indication information, the first type 2 configured grant configuration list further includes: a position of second indication information corresponding to the type 2 configured grant configuration in the group DCI.

Optionally, the second type 2 configured grant configuration list includes an index of the type 2 configured grant configuration.

S202. The terminal receives the configuration information of the group DCI sent by the network device.

Correspondingly, when the terminal receives the configuration information of the group DCI, step S103 in the solution provided in this embodiment may be replaced with step S203.

S203. The terminal receives the group DCI based on the configuration information of the group DCI.

Based on the solution shown in FIG. 10, the network device delivers the configuration information of the group DCI to the terminal, so that the terminal can successfully receive the group DCI.

The following describes the uplink dynamic grant-free transmission configuration method shown in FIG. 3 with reference to a specific application scenario.

Figure 11:
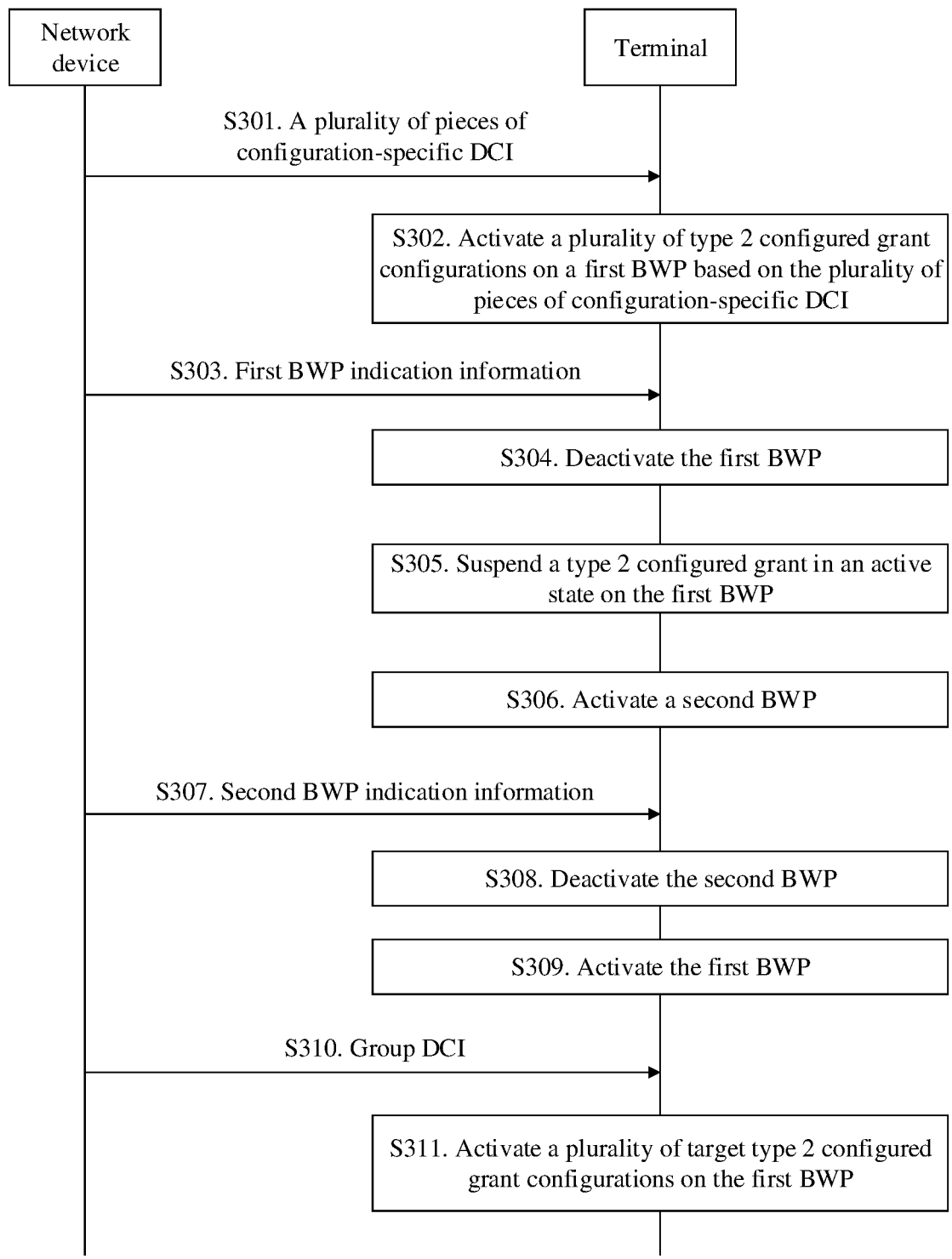
FIG. 11 is a third flowchart of an uplink dynamic grant-free transmission configuration method according to an embodiment.

As shown in FIG. 11, an embodiment provides an uplink dynamic grant-free transmission configuration method, including the following steps.

S301. A network device sends a plurality of pieces of configuration-specific DCI to a terminal, so that the terminal receives the plurality of pieces of configuration-specific DCI.

Each piece of configuration-specific DCI is used to indicate the terminal to activate one type 2 configured grant configuration on a first BWP. For example, the configuration-specific DCI may be in DCI format 0_0/0_1 defined in an NR protocol.

S302. The terminal activates a plurality of type 2 configured grant configurations on the first BWP based on the plurality of pieces of configuration-specific DCI.

S303. The network device sends first BWP indication information to the terminal, so that the terminal receives the first BWP indication information. The first BWP indication information is used to indicate the terminal to use a second BWP.

The first BWP indication information is transmitted in a form of higher layer signaling or downlink control information.

S304. The terminal deactivates the first BWP.

S305. The terminal suspends a type 2 configured grant configuration in an active state on the first BWP.

S306. The terminal activates the second BWP.

S307. The network device sends second BWP indication information to the terminal, so that the terminal receives the second BWP indication information. The second BWP indication information is used to indicate the terminal to use the first BWP.

S308. The terminal deactivates the second BWP.

S309. The terminal activates the first BWP.

S310. The network device sends group DCI to the terminal, so that the terminal receives the group DCI. The group DCI is used to indicate the terminal to activate a plurality of target type 2 configured grant configurations on the first BWP.

Optionally, the target type 2 configured grant configuration is a type 2 configured grant configuration that is in the active state on the first BWP before the terminal receives the first BWP indication information.

S311. The terminal activates the plurality of target type 2 configured grant configurations on the first BWP.

Figure 12:
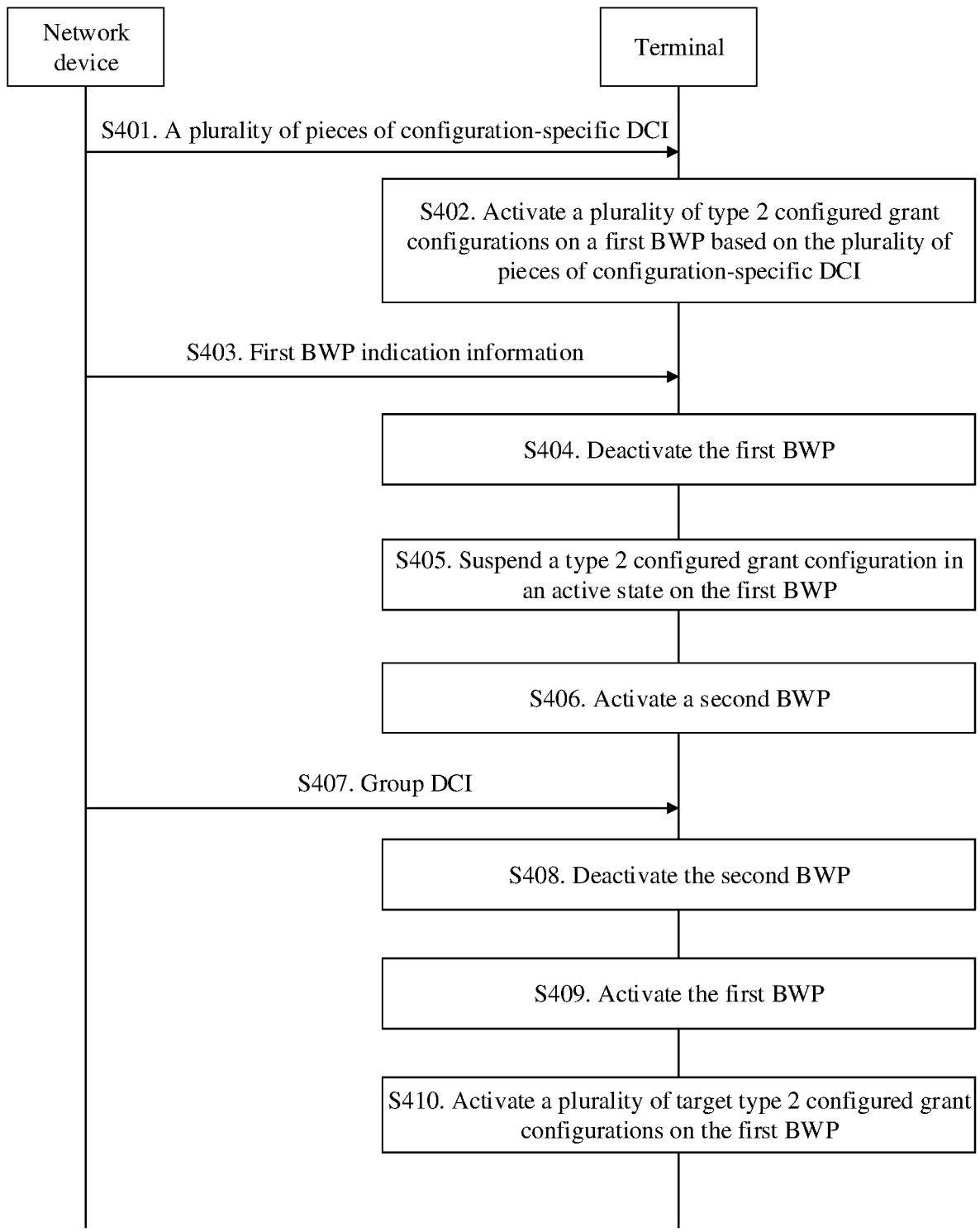
FIG. 12 is a fourth flowchart of an uplink dynamic grant-free transmission configuration method according to an embodiment.

As shown in FIG. 12, an embodiment provides an uplink dynamic grant-free transmission configuration method, including the following steps.

S401 to S406 are the same as steps S301 to S306. For related descriptions, refer to the method shown in FIG. 10. Details are not described again in this embodiment.

S407. The network device sends group DCI to the terminal, where the group DCI includes second BWP indication information, the second BWP indication information is used to indicate the terminal to use the first BWP, and the group DCI is used to indicate the terminal to activate a plurality of target type 2 configured grant configurations on the first BWP.

Optionally, the target type 2 configured grant configuration is a type 2 configured grant configuration that is in the active state on the first BWP before the terminal receives the first BWP indication information.

S408. The terminal deactivates the second BWP.

S409. The terminal activates the first BWP.

S410. The terminal activates the plurality of target type 2 configured grant configurations on the first BWP.

The foregoing mainly describes the solutions provided in the embodiments from a perspective of interaction between network elements. It may be understood that, in order to implement the foregoing functions, the network elements, such as the network device and the terminal, include corresponding hardware structures and/or software modules for performing the functions. A person of ordinary skill in the art should be aware that, in combination with units and algorithm steps in the examples described in the embodiments, the embodiments can be implemented by hardware or a combination of hardware and computer software. Whether a function is performed by hardware or hardware driven by computer software depends on particular applications and design constraints of the solutions. A person of ordinary skill in the art may use different methods to implement the described functions for each particular application, but it should not be considered that the implementation goes beyond the scope of the embodiments.

In the embodiments, functional modules of the network device and the terminal may be obtained through division based on the foregoing method examples. For example, each functional module may be obtained through division based on each corresponding function, or two or more functions may be integrated into one processing module. The integrated module may be implemented in a form of hardware or may be implemented in a form of a software functional module. It should be noted that, in the embodiments, division into the modules is an example, and is merely logical function division. During actual implementation, another division manner may be used. An example in which each functional module is obtained through division based on each corresponding function is used below for description.

Figure 13:
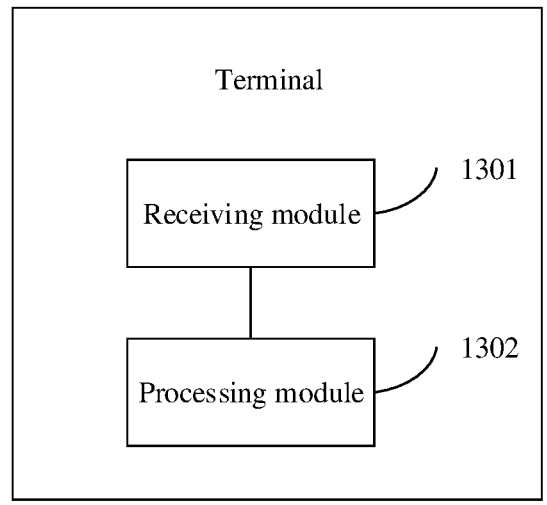
FIG. 13 is a schematic structural diagram of a terminal according to an embodiment.

FIG. 13 is a schematic structural diagram of a terminal according to an embodiment. As shown in FIG. 13, the terminal includes a receiving module 1301 and a processing module 1302. The receiving module 1301 is configured to support the terminal in performing step S103 in FIG. 3, steps S202 and S203 in FIG. 10, steps S301, S303, S307, and S310 in FIG. 11, steps S401, S403, and S407 in FIG. 12, and/or another process used for the solutions described in the embodiments. The processing module 1302 is configured to support the terminal in performing step S104 in FIG. 3, steps S302, S304 to S306, S308, S309, and S311 in FIG. 11, steps S402, S404 to S406, and S408 to S410 in FIG. 12, and/or another process used for the solutions described. All related content of the steps in the foregoing method embodiments may be cited in function descriptions of the corresponding functional modules. Details are not described herein again.

In an example, with reference to the terminal shown in FIG. 2, the receiving module 1301 in FIG. 13 may be implemented by the transceiver 303 in FIG. 2, and the processing module 1302 in FIG. 13 may be implemented by the processor 301 in FIG. 2. This is not limited in this embodiment.

An embodiment further provides a computer-readable storage medium. The computer-readable storage medium stores a computer instruction, and when the computer-readable storage medium runs on the terminal shown in FIG. 2, the terminal is enabled to perform the uplink dynamic grant-free transmission configuration method shown in each of FIG. 3 and FIG. 10 to FIG. 12. The computer instruction may be stored in the computer-readable storage medium or may be transmitted from one computer-readable storage medium to another computer-readable storage medium. For example, the computer instruction may be transmitted from one website, computer, server, or data center to another website, computer, server, or data center in a wired (for example, a coaxial cable, an optical fiber, or a digital subscriber line (DSL)) or wireless (for example, infrared, wireless, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive (SSD)), or the like.

An embodiment further provides a chip system. The chip system includes a processor, configured to support a terminal in implementing the uplink dynamic grant-free transmission configuration method shown in each of FIG. 3 and FIG. 10 to FIG. 12. In a possible implementation, the chip system further includes a memory. The memory is configured to store a program instruction and data that are necessary for the terminal. However, it may be understood that the memory may not exist in the chip system. The chip system may include a chip or may include a chip and another discrete component. This is not limited in this embodiment.

An embodiment further provides a computer program product including a computer instruction. When the computer program product runs on the terminal shown in FIG. 2, a computer is enabled to perform the uplink dynamic grant-free transmission method shown in each of FIG. 3 and FIG. 10 to FIG. 12.

The terminal, the computer storage medium, the chip system, and the computer program product provided in the foregoing embodiments are all configured to perform the uplink dynamic grant-free transmission configuration method provided above. Therefore, for effects that can be achieved by the terminal, the computer storage medium, the chip system, and the computer program product, refer to effects corresponding to the method provided above, and details are not described herein again.

Figure 14:
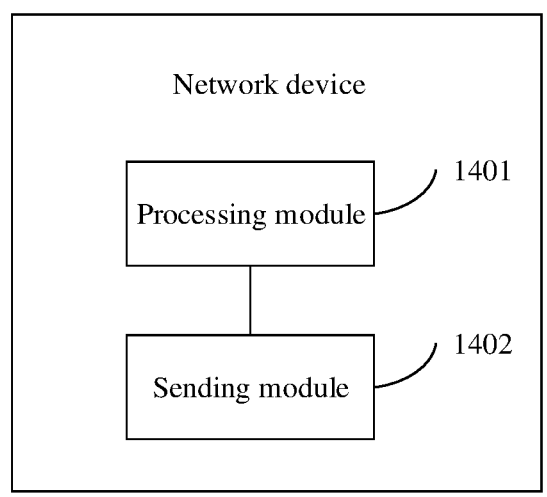
FIG. 14 is a schematic structural diagram of a network device according to an embodiment.

FIG. 14 is a schematic structural diagram of a network device according to an embodiment. As shown in FIG. 14, the network device includes a processing module 1401 and a sending module 1402. The processing module 1401 is configured to support the network device in performing step S101 in FIG. 3, and/or another process used for the solutions described in the embodiments. The sending module 1402 is configured to support the network device in performing step S102 in FIG. 3, step S201 in FIG. 10, steps S301, S303, S307, and S310 in FIG. 11, steps S401, S403, and S407 in FIG. 12, and/or another process used for the solutions described in the embodiments. All related content of the steps in the foregoing method embodiments may be cited in function descriptions of the corresponding functional modules. Details are not described herein again.

In an example, with reference to the network device shown in FIG. 2, the processing module 1401 in FIG. 14 may be implemented by the processor 201 in FIG. 2, and the sending module 1402 in FIG. 14 may be implemented by the transceiver 203 in FIG. 2. This is not limited in this embodiment.

An embodiment further provides a computer-readable storage medium. The computer-readable storage medium stores an instruction, and when the computer-readable storage medium runs on the network device shown in FIG. 2, the network device is enabled to perform the uplink dynamic grant-free transmission configuration method shown in each of FIG. 3 and FIG. 10 to FIG. 12.

An embodiment further provides a chip system. The chip system includes a processor, configured to support the network device in performing the uplink dynamic grant-free transmission configuration method shown in each of FIG. 3 and FIG. 10 to FIG. 12. In a possible implementation, the chip system further includes a memory. The memory is configured to store a program instruction and data that are necessary for the network device. Further, it may be understood that the memory may not exist in the chip system. The chip system may include a chip or may include a chip and another discrete component. This is not limited in this embodiment.

An embodiment further provides a computer program product including a computer instruction. When the computer program product runs on the network device shown in FIG. 2, a computer is enabled to perform the uplink dynamic grant-free transmission method shown in each of FIG. 3 and FIG. 10 to FIG. 12.

The network device, the computer storage medium, the chip system, and the computer program product provided in the foregoing embodiments are all configured to perform the uplink dynamic grant-free transmission configuration method provided above. Therefore, for effects that can be achieved by the network device, the computer storage medium, the chip system, and the computer program product, refer to effects corresponding to the method provided above, and details are not described herein again.

Although is the embodiments are described with reference to specific features and implementations, it is clear that various modifications and combinations may be made to them without departing from the spirit and scope of the embodiments. Correspondingly, the embodiments and the accompanying drawings are merely examples, and are considered as any of or all modifications, variations, combinations, or equivalents that cover the scope. It is clear that, a person of ordinary skill in the art can make various modifications and variations to the embodiments without departing from the spirit and scope of the embodiments.

What is claimed is:

1. A terminal, comprising:
a receiving module configured to receive downlink control information, wherein the downlink control information comprises a plurality of pieces of indication information, each piece of indication information corresponds to one type 2 configured grant configuration, the indication information is used to indicate the terminal to perform an operation on the type 2 configured grant configuration corresponding to the indication information, and the operation comprises: activating, deactivating, or maintaining a state; and
a processing module configured to perform corresponding operations on the plurality of type 2 configured grant configurations based on the downlink control information,
wherein:
the receiving module is further configured to receive first bandwidth part (BWP) indication information, wherein the first BWP indication information is used to indicate the terminal to use a second BWP;
the processing module is further configured to: deactivate a first BWP and suspend all type 2 configured grants in an active state on the first BWP, wherein the first BWP is a BWP used by the terminal before the terminal receives the first BWP indication information;
the processing module is further configured to activate the second BWP;
the receiving module is further configured to receive second BWP indication information, wherein the second BWP indication information is used to indicate the terminal to use the first BWP;
the processing module is further configured to: deactivate the second BWP, and activate the first BWP; and
the processing module is further configured to: if the downlink control information is used to indicate the terminal to activate a plurality of target type 2 configured grants on the first BWP, activate the plurality of target type 2 configured grants on the first BWP, wherein the target type 2 configured grant is a type 2 configured grant that is in the active state on the first BWP before the terminal receives the first BWP indication information.

2. The terminal according to claim 1, wherein the indication information comprises a first bit field and a second bit field; and
the indication information being used to indicate the terminal to perform the operation on the type 2 configured grant configuration corresponding to the indication information comprises at least one of the following cases:

if a value of the first bit field is a first preset value, the indication information is used to indicate the terminal to activate the type 2 configured grant configuration corresponding to the indication information;

if a value of the first bit field is a second preset value, and a value of the second bit field is a third preset value, the indication information is used to indicate the terminal to deactivate the type 2 configured grant configuration corresponding to the indication information; or if a value of the first bit field is a second preset value, and a value of the second bit field is not a third preset value, the indication information is used to indicate the terminal to maintain a state of the type 2 configured grant configuration corresponding to the indication information.

3. The terminal according to claim 2, wherein the second bit field is used to indicate a time domain offset value of the type 2 configured grant configuration corresponding to the indication information.

4. The terminal according to claim 1, wherein the indication information is further used to indicate one or more of the following parameters:
a demodulation reference signal, a modulation and coding scheme, and a time-frequency resource.

5. The terminal according to claim 1, wherein
the receiving module is further configured to receive configuration information of the downlink control information; and
the processing module is further configured to receive the downlink control information based on the configuration information that is of the downlink control information and that is received by the receiving module.

6. The terminal according to claim 5, wherein the configuration information of the downlink control information comprises at least one or more of the following parameters:
a radio network temporary identifier;
a payload size of the downlink control information;
a first serving cell list, wherein the first serving cell list is used to indicate a serving cell to which the downlink control information is applied; and
a second serving cell list, wherein the second serving cell list is used to indicate a serving cell to which the downlink control information is not applied.

7. A terminal comprising:
a receiving module configured to receive downlink control information, wherein the downlink control information comprises a plurality of pieces of indication information, each piece of indication information corresponds to one type 2 configured grant configuration, the indication information is used to indicate the terminal to perform an operation on the type 2 configured grant configuration corresponding to the indication information, and the operation comprises: activating, deactivating, or maintaining a state; and
a processing module configured to perform corresponding operations on the plurality of type 2 configured grant configurations based on the downlink control information,
wherein:
the receiving module is further configured to receive first bandwidth part (BWP) indication information, wherein the first BWP indication information is used to indicate the terminal to use a second BWP;
the processing module is further configured to: deactivate a first BWP and suspend all type 2 configured grants in an active state on the first BWP, wherein the first BWP is a BWP used by the terminal before the terminal receives the first BWP indication information;
the processing module is further configured to activate the second BWP;
the processing module is further configured to: if the downlink control information comprises second BWP indication information, deactivate the second BWP, and activate the first BWP, wherein the second BWP indication information is used to indicate the terminal to use the first BWP; and
the processing module is further configured to: if the downlink control information is used to indicate the terminal to activate a plurality of target type 2 configured grants on the first BWP, activate the plurality of target type 2 configured grants on the first BWP, wherein the target type 2 configured grant is a type 2 configured grant that is in the active state on the first BWP before the terminal receives the first BWP indication information.

8. A network device, comprising:
a processing module configured to generate downlink control information, wherein the downlink control information comprises a plurality of pieces of indication information, each piece of indication information corresponds to one type 2 configured grant configuration, the indication information is used to indicate a terminal to perform an operation on the type 2 configured grant configuration corresponding to the indication information, and the operation comprises: activating, deactivating, or maintaining a state; and
a sending module configured to:
send the downlink control information to the terminal,
send first bandwidth part (BWP) indication information, wherein the first BWP indication information is used to indicate the terminal to use a second BWP by (a) deactivating a first BWP, (b) suspending all type 2 configured grants in an active state on the first BWP, wherein the first BWP is a BWP used by the terminal before the terminal receives the first BWP indication information, and (c) activating the second BWP, and
send second BWP indication information, wherein the second BWP indication information is used to indicate the terminal to use the first BWP by (a) deactivating the second BWP, (b) activating the first BWP, and (c) if the downlink control information is used, (c1) indicating the terminal to activate a plurality of target type 2 configured grants on the first BWP and (c2) activating the plurality of target type 2 configured grants on the first BWP, wherein the target type 2 configured grant is a type 2 configured grant that is in the active state on the first BWP before the terminal receives the first BWP indication information.

9. The network device according to claim 8, wherein the indication information comprises a first bit field and a second bit field; and
that the indication information is used to indicate the terminal to perform the operation on the type 2 configured grant configuration corresponding to the indication information comprises at least one of the following cases:
if a value of the first bit field is a first preset value, the indication information is used to indicate the terminal to activate the type 2 configured grant configuration corresponding to the indication information;

if a value of the first bit field is a second preset value, and a value of the second bit field is a third preset value, the indication information is used to indicate the terminal to deactivate the type 2 configured grant configuration corresponding to the indication information; or if a value of the first bit field is a second preset value, and a value of the second bit field is not a third preset value, the indication information is used to indicate the terminal to maintain a state of the type 2 configured grant configuration corresponding to the indication information.

10. The network device according to claim 9, wherein the second bit field is used to indicate a time domain offset value of the type 2 configured grant configuration corresponding to the indication information.

11. The network device according to claim 8, wherein the indication information is further used to indicate one or more of the following parameters:
a demodulation reference signal, a modulation and coding scheme, and a time-frequency resource.

12. The network device according to claim 8, wherein the sending module is further configured to send configuration information of the downlink control information to the terminal.

13. An uplink dynamic grant-free transmission configuration method, comprising:
generating, by a network device, downlink control information, wherein the downlink control information comprises a plurality of pieces of indication information, each piece of indication information corresponds to one type 2 configured grant configuration, the indication information is used to indicate a terminal to perform an operation on the type 2 configured grant configuration corresponding to the indication information, and the operation comprises: activating, deactivating, or maintaining a state;
sending, by the network device, the downlink control information to the terminal;
sending first bandwidth part (BWP) indication information, wherein the first BWP indication information is used to indicate the terminal to use a second BWP by (a) deactivating a first BWP, (b) suspending all type 2 configured grants in an active state on the first BWP, wherein the first BWP is a BWP used by the terminal before the terminal receives the first BWP indication information, and (c) activating the second BWP, and
sending second BWP indication information, wherein the second BWP indication information is used to indicate the terminal to use the first BWP by (a) deactivating the second BWP, (b) activating the first BWP, and (c) if the downlink control information is used, (c1) indicating the terminal to activate a plurality of target type 2 configured grants on the first BWP and (c2) activating the plurality of target type 2 configured grants on the first BWP, wherein the target type 2 configured grant is a type 2 configured grant that is in the active state on the first BWP before the terminal receives the first BWP indication information.

14. The uplink dynamic grant-free transmission configuration method according to claim 13, wherein the indication information comprises a first bit field and a second bit field; and
that the indication information is used to indicate the terminal to perform the operation on the type 2 configured grant configuration corresponding to the indication information comprises at least one of the following cases:
if a value of the first bit field is a first preset value, the indication information is used to indicate the terminal to activate the type 2 configured grant configuration corresponding to the indication information;
if a value of the first bit field is a second preset value, and a value of the second bit field is a third preset value, the indication information is used to indicate the terminal to deactivate the type 2 configured grant configuration corresponding to the indication information; or
if a value of the first bit field is a second preset value, and a value of the second bit field is not a third preset value, the indication information is used to indicate the terminal to maintain a state of the type 2 configured grant configuration corresponding to the indication information.

15. The uplink dynamic grant-free transmission configuration method according to claim 14, wherein the second bit field is used to indicate a time domain offset value of the type 2 configured grant configuration corresponding to the indication information.

16. The uplink dynamic grant-free transmission configuration method according to claim 13, wherein before the sending, by the network device, of the downlink control information to the terminal, the method further comprises:
sending, by the network device, configuration information of the downlink control information to the terminal.

17. The uplink dynamic grant-free transmission configuration method according to claim 16, wherein the configuration information of the downlink control information comprises at least one or more of the following parameters:
a radio network temporary identifier;
a payload size of the downlink control information;
a first serving cell list, wherein the first serving cell list is used to indicate a serving cell to which the downlink control information is applied; and
a second serving cell list, wherein the second serving cell list is used to indicate a serving cell to which the downlink control information is not applied.

* * * * *